United States Patent
Ha et al.

(10) Patent No.: US 10,815,429 B2
(45) Date of Patent: Oct. 27, 2020

(54) METHOD FOR DEOXYGENATING OF OXYGENATED HYDROCARBONS USING HYDROGENATION CATALYST AND HYDRODEOXYGENATION

(71) Applicant: KOREA INSTITUTE OF SCIENCE AND TECHNOLOGY, Seoul (KR)

(72) Inventors: Jeong Myeong Ha, Seoul (KR); Jangwoo Seo, Seoul (KR); Jae Wook Choi, Seoul (KR); Jong Min Park, Seoul (KR); Young Hyun Yoon, Seoul (KR); Dong Jin Suh, Seoul (KR); Jungho Jae, Seoul (KR); Gi Seok Yang, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 16/281,093

(22) Filed: Feb. 21, 2019

(65) Prior Publication Data

US 2020/0071620 A1    Mar. 5, 2020

(30) Foreign Application Priority Data

Sep. 3, 2018 (KR) .................. 10-2018-0104571

(51) Int. Cl.
 *C10G 3/00* (2006.01)
 *B01J 23/89* (2006.01)

(52) U.S. Cl.
 CPC ............ *C10G 3/50* (2013.01); *B01J 23/8993* (2013.01); *C10G 3/46* (2013.01); *C10G 3/47* (2013.01); *C10G 2300/1011* (2013.01); *C10G 2300/4006* (2013.01); *C10G 2300/4012* (2013.01)

(58) Field of Classification Search
 CPC ... C10G 3/00; C10G 3/50; C10G 3/46; C10G 3/47; B01J 23/89
 See application file for complete search history.

(56) References Cited

U.S. PATENT DOCUMENTS

| 7,833,934 B2 | 11/2010 | Potapova et al. |
| 2003/0115800 A1 | 6/2003 | Yamada et al. |

FOREIGN PATENT DOCUMENTS

| JP | 2003246990 A | | 9/2003 | |
| JP | 20091722 A | | 1/2009 | |
| JP | 2009001722 A | * | 1/2009 | ............... C10G 3/42 |
| KR | 1020130041011 A | | 4/2013 | |

(Continued)

OTHER PUBLICATIONS

Kim et al. (Upgrading of sawdust pyrolysis oil to hydrocarbon fuels using tungstate-zirconia-supported Ru catalysts with less formation of cokes, Jun. 15, 2017, Journal of Industrial and Engineering Chemistry, 57 (2017) 74-81) (Year: 2017).*

(Continued)

*Primary Examiner* — Youngsul Jeong
(74) *Attorney, Agent, or Firm* — Cantor Colburn LLP

(57) ABSTRACT

Provided is a method for deoxygenating an oxygenated hydrocarbon compound using a hydrogenation catalyst of immersing a metal in a carrier comprising a metal oxide and a hydrodeoxygenation catalyst of immersing a metal in a carrier comprising a metal oxide. It is possible to increase deoxygenation efficiency by combining the hydrogenation catalyst and the hydrodeoxygenation catalyst.

15 Claims, 1 Drawing Sheet

(56) References Cited

FOREIGN PATENT DOCUMENTS

| KR | 101305907 B1 | 9/2013 |
| KR | 101571129 B1 | 11/2015 |

OTHER PUBLICATIONS

JP-2009001722-A_English Translation (Year: 2009).*

Inho Kim et al., "Upgrading of sawdust pyrolysis oil to hydrocarbon fuels using tungstate-zirconia-supported Ru catalysts with less formation of cokes", Journal of Industrial and Engineering Chemistry, 2017, pp. 74-81, vol. 56, Elsevier B.V.

Sebastian Dieter Foraita, "Investigation of Ni/ZrO2 catalysts for the hydrodeoxygenation of microalgae oil", Media TUM, 2017, 139 pages.

Zhan Si et al., "An Overview on Catalytic Hydrodeoxygenation of Pyrolysis Oil and Its Model Compounds," Catalysts, 2017, 22 pages, vol. 7, No. 169.

* cited by examiner

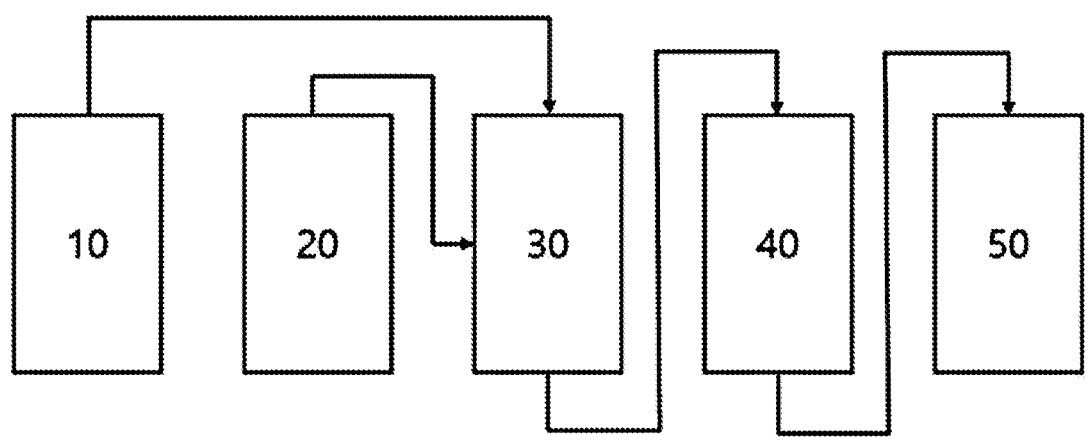

METHOD FOR DEOXYGENATING OF OXYGENATED HYDROCARBONS USING HYDROGENATION CATALYST AND HYDRODEOXYGENATION

CROSS-REFERENCE TO RELATED APPLICATION

This application claims the priorities of Korean Patent Application No. 10-2018-0104571, filed on Sep. 3, 2018, and all the benefits accruing therefrom under 35 U.S.C. § 119, the contents of which in their entirety are herein incorporated by reference.

BACKGROUND

1. Field

The present disclosure relates to a method for deoxygenating an oxygenated hydrocarbon compound using hydrogenation and hydrodeoxygenation catalysts.

Description about National Support Research and Development

This research was conducted by Korea Institute of Science and Technology under the management of Korea Energy Technology Evaluation Institute under the Ministry of Trade, Industry and Energy, the research industry name is the development of core technology for renewable energy, and the research project name is the development of catalyst reaction technology for high carbon hydrogen fuelization of furan-based compounds derived from unfractionated sugars (project unique number: 1415154087).

2. Description of the Related Art

The need to develop alternative energy is emerging in order to solve depletion of fossil fuels and environmental problems. Among the alternative energy, biomass is attracting much attention because it is inexpensive, can obtain rich raw materials, and is a sustainable carbon source to replace fossil fuels, and researches have been actively conducted to use the biomass as fuel.

One of the difficulties in producing fuels with biomass is that a large amount of oxygen is contained within the molecular structures of biomass and a biomass decomposition product. Because of this, in most cases of producing fuel using biomass, an oxygenated hydrocarbon compound is inevitably included. When the oxygen content in the oxygenated hydrocarbon compound is high, viscosity and acidity are increased and stability and calorific values are decreased to lower the fuel quality. Therefore, in order to improve the quality of the fuel, deoxygenation of the oxygenated hydrocarbon compound for removing oxygen and saturating unsaturated bonds is required. Many researches have been conducted in this field, and it is necessary to develop a method which can suppress the deactivation of the catalyst and perform an operation for a long period for stable deoxygenation.

SUMMARY

In one aspect, an object of the present disclosure is to provide a reaction method of preparing a deoxygenated compound from an oxygenated hydrocarbon compound using a hydrogenation catalyst in a first step and a hydrodeoxygenation catalyst in a second step.

An aspect of the present invention provides a method for deoxygenating an oxygenated hydrocarbon compound comprising: a first-step hydrogenation reaction using a hydrogenation catalyst comprising at least one metal selected from the group consisting of nickel (Ni), palladium (Pd), and cobalt (Co), which is immersed in a carrier comprising a metal oxide; and a second-step hydrodeoxygenation reaction using a hydrodeoxygenation catalyst comprising at least one metal selected from the group consisting of nickel (Ni), ruthenium (Ru), palladium (Pd), and platinum (Pt), which is immersed in a carrier comprising a metal oxide.

In an exemplary embodiment, the metal oxide of the hydrogenation catalyst may be at least one selected from the group consisting of ceria (cerium oxide, $CeO_2$) and zirconia (zirconium oxide, $ZrO_2$).

In an exemplary embodiment, the metal oxide of the hydrodeoxygenation catalyst may be at least one selected from the group consisting of tungstate zirconia (W—$ZrO_2$), silica, alumina, silica-alumina, and zirconia.

In an exemplary embodiment, the tungstate zirconia carrier of the hydrodeoxygenation catalyst may be a mixed oxide comprising tungsten and zirconium.

In an exemplary embodiment, the content of tungsten comprised in the tungstate zirconia carrier of the hydrodeoxygenation catalyst may be 5 wt % to 25 wt % based on the total weight of the carrier.

In an exemplary embodiment, the content of the metal immersed in the hydrogenation catalyst may be 0.01 wt % to 70 wt % based on the total weight of the hydrogenation catalyst.

In an exemplary embodiment, the content of the metal immersed in the hydrodeoxygenation catalyst may be 0.01 wt % to 70 wt % based on the total weight of the hydrodeoxygenation catalyst.

In an exemplary embodiment, the deoxygenation reaction may be carried out in a catalyst reactor having two steps or more connecting the first and second-step reactions.

In an exemplary embodiment, the first and second-step reactions may be carried out continuously in the deoxygenation reaction.

In an exemplary embodiment, the hydrotreating reaction may be carried out at 50° C. to 250° C.

In an exemplary embodiment, the hydrodeoxygenation reaction may be carried out at 50 bar to 150 bar.

In an exemplary embodiment, the deoxygenation method may further comprise injecting an oxygenated hydrocarbon compound and high-pressure hydrogen in a reactor; carrying out a hydrogenation reaction by adding a hydrogenation catalyst; and carrying out a hydrodeoxygenation reaction by adding a hydrodeoxygenation catalyst.

In an exemplary embodiment, the deoxygenation method may increase an oil yield by adding a hydrotreating reaction before the hydrodeoxygenation reaction.

In an exemplary embodiment, the deoxygenation method may suppress deactivation of the hydrodeoxygenation catalyst by adding a hydrotreating reaction before the hydrodeoxygenation reaction.

BRIEF DESCRIPTION OF THE DRAWINGS

The above and other aspects, features and advantages of the disclosed example embodiments will be more apparent from the following detailed description taken in conjunction with the accompanying a drawing in which:

FIGURE illustrates a continuous deoxygenation reactor for an oxygenated hydrocarbon compound used in the production of a hydrodeoxygenated compound. In the drawing, reference numerals 10, 20, 30, 40, and 50 illustrate a hydrogen storage device, a raw material injecting container,

DETAILED DESCRIPTION

Example embodiments are described more fully hereinafter. The invention may, however, be embodied in many different forms and should not be construed as limited to the example embodiments set forth herein. Rather, these example embodiments are provided so that this disclosure will be thorough and complete, and will fully convey the scope of the invention to those skilled in the art. In the description, details of features and techniques may be omitted to more clearly disclose example embodiments.

The terminology used herein is for the purpose of describing particular embodiments only and is not intended to be limiting of the invention. As used herein, the singular forms "a," "an" and "the" are intended to include the plural forms as well, unless the context clearly indicates otherwise. Furthermore, the use of the terms a, an, etc. do not denote a limitation of quantity, but rather denote the presence of at least one of the referenced item. The terms "first," "second," and the like do not imply any particular order, but are included to identify individual elements. Moreover, the use of the terms first, second, etc. do not denote any order or importance, but rather the terms first, second, etc. are used to distinguished one element from another.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail.

In one aspect, a technique disclosed in this specification provides a deoxygenation reaction method of an oxygenated hydrocarbon compound comprising a first-step hydrogenation reaction using a hydrogenation catalyst; and a second-step hydrodeoxygenation reaction using a hydrodeoxygenation catalyst.

The method disclosed in this specification relates to a method of preparing deoxygenation fuel through hydrogenation and hydrodeoxygenation of an oxygenated hydrocarbon compound, for example, pyrolysis oil. More particularly, the method relates to a deoxygenation reaction method of an oxygenated hydrocarbon compound including removing oxygen atoms from the oxygenated hydrocarbon compound by adding hydrogenation and hydrodeoxygenation catalysts to the oxygenated hydrocarbon compound in two steps to improve reactivity. The method has an effect of preparing a high-yield deoxygenation hydrocarbon compound from the oxygenated hydrocarbon compound.

The "oxygenated hydrocarbon compound" refers to a hydrocarbon compound that may be a precursor or raw material for a petroleum substitute fuel and comprises oxygen atoms in its molecular structure. The oxygenated hydrocarbon compound may be a mixture of low carbon compounds obtained by decomposition of, for example, various biomass including wood and herbaceous, organic waste, plastic and the like.

In an exemplary embodiment, the oxygenated hydrocarbon compound may be pyrolysis oil of biomass.

In an exemplary embodiment, the oxygenated hydrocarbon compound may comprise at least one selected from the group consisting of guaiacol, diphenyl ether, and benzyl phenyl ether. The guaiacol, diphenyl ether, and benzyl phenyl ether may be a lignin monomer obtained from pyrolysis oil of woody biomass.

The "hydrogenation reaction" means a reaction of reducing the unsaturation of the oxygenated hydrocarbon compound and reducing the number of functional groups inducing the catalyst deactivation.

The "hydrodeoxygenation reaction" means a reaction of removing oxygen atoms in the molecule of the oxygenated hydrocarbon compound by adding hydrogen.

In an exemplary embodiment, the deoxygenation method may comprise a first-step hydrogen reaction using a hydrogenation catalyst comprising at least one metal selected from the group consisting of nickel (Ni), palladium (Pd), cobalt (Co), copper (Cu), platinum (Pt), iridium (Ir), rhodium (Rh), and ruthenium (Ru), which is immersed in a carrier comprising a metal oxide; and a second-step hydrodeoxygenation reaction using a hydrodeoxygenation catalyst comprising at least one metal selected from the group consisting of nickel (Ni), ruthenium (Ru), palladium (Pd), platinum (Pt), copper (Cu), cobalt (Co), iridium (Ir), and rhodium (Rh), which is immersed in a carrier comprising a metal oxide.

The catalyst that may be used in the hydrogenation reaction according to the present specification needs to facilitate a hydrogenation reaction and minimize coke formation and cracking. Metals such as copper (Cu) and platinum (Pt) are less active in the hydrogenation reaction and metals such as ruthenium (Ru) may cause excessive cracking, and thus are not suitable for the hydrogenation reaction.

The catalyst that may be used in the hydrodeoxygenation reaction according to the present specification needs to facilitate a hydrodeoxygenation reaction and minimize coke formation and cracking. In the case of platinum (Pt), cracking is minimized and a high yield is obtained, and in the case of ruthenium (Ru), low coke formation is shown, but cost efficiency is low. Nickel (Ni) can be used as it is a metal having high cost efficiency capable of replacing platinum and ruthenium.

In an exemplary embodiment, the metal oxide of the hydrogenation catalyst may be at least one selected from the group consisting of ceria (cerium oxide, $CeO_2$), zirconia (zirconium oxide, $ZrO_2$), carbon, silica ($SiO_2$), alumina ($Al_2O_3$), silica-alumina, and titania ($TiO_2$).

The carrier of the catalyst used in the hydrogenation reaction according to the present specification needs to be stable during the reaction and minimize coke formation and cracking. Since aluminum oxide (alumina, $Al_2O_3$) has a lot of acid sites, coke may be easily formed and an unstable product may be formed. In the case of titanium oxide ($TiO_2$), hydrogenation reaction activity is poor.

In an exemplary embodiment, the metal oxide of the hydrodeoxygenation catalyst may be at least one selected from the group consisting of tungstate zirconia ($W-ZrO_2$), silica, alumina, silica-alumina, zirconia, carbon, and titania ($TiO_2$).

In an exemplary embodiment, the metal oxide of the hydrogenation catalyst may be ceria (cerium oxide, $CeO_2$).

In an exemplary embodiment, the metal oxide of the hydrodeoxygenation catalyst may be tungstate zirconia (W—$ZrO_2$).

In the catalyst disclosed in the present specification, the metal immersed in the carrier may be a single metal or two or more metals.

In an exemplary embodiment, in the hydrogenation catalyst, nickel (Ni) may be immersed in a metal oxide carrier, and in the hydrodeoxygenation catalyst, ruthenium (Ru) or nickel (Ni) may be immersed in the metal oxide carrier.

In an exemplary embodiment, in the hydrogenation catalyst, nickel (Ni) may be immersed in ceria (cerium oxide, $CeO_2$), and in the hydrodeoxygenation catalyst, ruthenium (Ru) or nickel (Ni) may be immersed in tungstate zirconia (W—$ZrO_2$).

In an exemplary embodiment, in the hydrogenation catalyst, nickel (Ni) may be immersed in zirconia (zirconium oxide, $ZrO_2$), and in the hydrodeoxygenation catalyst, ruthenium (Ru) or nickel (Ni) may be immersed in tungstate zirconia (W—$ZrO_2$).

In an exemplary embodiment, the tungstate zirconia carrier of the hydrodeoxygenation catalyst may be a mixed oxide comprising tungsten and zirconium. The content of tungsten comprised in the tungstate zirconia carrier, which is the hydrodeoxygenation catalyst according to the present disclosure, may be 5 wt % to 25 wt % based on the total weight of the carrier. In another aspect, the tungsten content may be 5 wt % or more, 6 wt % or more, 7 wt % or more, or 8 wt % or more and 25 wt % or less, 18 wt % or less, 16 wt % or less, or 14 wt % or less based on the total weight of the carrier, and preferably, 10 wt %.

In an exemplary embodiment, the content of the metal immersed in the hydrogenation catalyst may be 0.01 wt % to 70 wt % based on the total weight of the hydrogenation catalyst. In another aspect, the content of the metal immersed in the hydrogenation catalyst may be 0.01 wt % or more, 0.1 wt % or more, 1 wt % or more, 3 wt % or more, 5 wt % or more, 7 wt % or more, 10 wt % or more, 12 wt % or more, 15 wt % or more, 18 wt % or more, or 20 wt % or more and 70 wt % or less, 68 wt % or less, 65 wt % or less, 62 wt % or less, 60 wt % or less, 58 wt % or less, 55 wt % or less, 52 wt % or less, or 50 wt % or less based on the total weight of the hydrogenation catalyst.

In an exemplary embodiment, the content of the metal immersed in the hydrodeoxygenation catalyst may be 0.01 wt % to 70 wt % based on the total weight of the hydrodeoxygenation catalyst. In another aspect, the content of the metal immersed in the hydrodeoxygenation catalyst may be 0.01 wt % or more, 0.1 wt % or more, 1 wt % or more, 3 wt % or more, 5 wt % or more, 7 wt % or more, 10 wt % or more, 12 wt % or more, 15 wt % or more, 18 wt % or more, or 20 wt % or more and 70 wt % or less, 68 wt % or less, 65 wt % or less, 62 wt % or less, 60 wt % or less, 58 wt % or less, 55 wt % or less, 52 wt % or less, or 50 wt % or less based on the total weight of the hydrodeoxygenation catalyst, and preferably 20 wt %.

In an exemplary embodiment, the deoxygenation reaction method may be carried out in a catalyst reactor having two steps or more connecting the first and second-step reactions.

The deoxygenation reaction method according to the present specification may be carried out continuously in the first and second-step reactions.

In an exemplary embodiment, the hydrogenation reaction may be carried out at 50° C. to 250° C. In another aspect, the hydrogenation reaction may be carried out at 50° C. or more, 80° C. or more, 110° C. or more, 140° C. or more, or 170° C. or more, and 250° C. or less, 240° C. or less, 230° C. or less, 220° C. or less, or 210° C. or less, preferably at 200° C. If the temperature of the hydrogenation reaction is less than 50° C., the hydrogenation is not properly carried out, and if the temperature is more than 250° C., the hydrodeoxygenation reaction immediately occurs to facilitate the catalyst deactivation.

In an exemplary embodiment, the hydrodeoxygenation reaction may be carried out at 200° C. to 400° C., or carried out at 200° C. or more, 230° C. or more, or 250° C. or more and 400° C. or less, 350° C. or less, or 300° C. or less, preferably at 250° C. If the temperature of the hydrodeoxygenation reaction is less than 200° C., the hydrodeoxygenation reaction is not properly carried out and the oxygenated hydrocarbon compound is not hydrodeoxygenated, and if the temperature is more than 400° C., the energy efficiency is lowered and the yield may be lowered, and thus it is not preferable.

In an exemplary embodiment, the hydrodeoxygenation reaction may be carried out at 50 bar to 150 bar, preferably at 100 bar.

In an exemplary embodiment, the hydrogenation reaction may be carried out at a weight hourly space velocity (WHSV) of 0.3 $h^{-1}$ to 2 $h^{-1}$ based on the total weight of the catalyst.

In an exemplary embodiment, the deoxygenation reaction method may further comprise: injecting an oxygenated hydrocarbon compound and high-pressure hydrogen in a reactor; carrying out a hydrogenation reaction by adding a hydrogenation catalyst; and carrying out a hydrodeoxygenation reaction by adding a hydrodeoxygenation catalyst.

In an exemplary embodiment, the deoxygenation reaction method has an effect of increasing an oil yield and suppressing deactivation of the hydrodeoxygenation catalyst by adding a hydrotreating reaction before the hydrodeoxygenation reaction.

In another aspect, in the present specification, the deoxygenation reaction method may be carried out in a deoxygenation reaction device for an oxygenated hydrocarbon compound comprising a hydrogen storage device 10, an oxygenated hydrocarbon compound injecting container 20, a high-pressure reactor for carrying out a two-step reaction 30, a cooling device 40, and a storage device 50.

In an exemplary embodiment, the reaction device may comprise a compressor for compressing high-pressure hydrogen.

In an exemplary embodiment, the reaction device may comprise a mass flow controller (MFC) for injecting hydrogen at a constant flow rate.

In an exemplary embodiment, the reaction device may comprise a pump for injecting the oxygenated hydrocarbon compound.

In an exemplary embodiment, the reaction device may comprise the reactor 30 which is connected with a heating device capable of separately carrying out the hydrogenation reaction and the hydrodeoxygenation reaction at the same time.

In an exemplary embodiment, the reaction device may comprise a back pressure regulator (BPR) for maintaining the pressure.

In an exemplary embodiment, the reaction device may comprise the cooling device 40 for liquefying a product after the reaction.

In an exemplary embodiment, the reaction device may comprise the storage device 50 for collecting the product generated after the reaction.

In yet another aspect, a technique disclosed in the present specification provides a method for preparing hydrogenation and hydrodeoxygenation catalysts of the oxygenated hydrocarbon compound.

In an exemplary embodiment, the method may comprise mixing a precursor aqueous solution of a catalyst component with a support and impregnating the mixture; and reducing and calcining the support impregnated the precursor aqueous solution of the catalyst component.

In an exemplary embodiment, a metal precursor, which is the precursor of the catalyst component, may be at least one selected from the group consisting of a metal salt compound, a metal acetate compound, a metal halide compound, a metal nitrate compound, a metal hydroxide compound, a metal carbonyl compound, a metal sulfate compound, and a metal fatty acid salt compound.

In an exemplary embodiment, the reducing process may be carried out at 300° C. to 900° C. for 1 hour to 20 hours under an atmosphere in which hydrogen is diluted with inert gas.

EXAMPLES

Hereinafter, the present invention will be described in more detail with reference to Examples. These Examples are just to exemplify the present invention, and it will be apparent to those skilled in the art that the scope of the present invention is not limited to these Examples.

Example 1

Preparation of Hydrogenation and Hydrodeoxygenation Catalysts

Preparation of Hydrogenation Catalyst

A hydrogenation catalyst may be prepared by a wet impregnation method. 50 g of distilled water and 5.5 g of nickel nitrate hexahydrate were mixed for 10 minutes and then added with 10 g of cerium oxide and stirred for 12 hours or more. After stirring, the mixture was transferred to a round flask, and heated to 60° C. to 70° C. under reduced pressure using a rotary evaporator to evaporate water. The obtained solid residue was dried in an oven at 105° C. for 16 hours to completely remove water. The dried solid was again calcined in an air atmosphere at 600° C. for 2 hours to remove impurities. The calcined catalyst was subjected to reduction at 550° C. in a 5% $H_2$/Ar atmosphere again. After the reduction, the catalyst was passivated for 30 minutes in a 1% $O_2/N_2$ atmosphere to prevent deactivation of the catalyst and then stored.

Preparation of Carrier of Hydrodeoxygenation Catalyst 4 g of zirconium hydroxide and 0.5 g of ammonium metatungstate hydrate were mixed with 50 g of distilled water and subjected to hydrothermal synthesis at 180° C. for 12 hours in an autoclave. Thereafter, the product was heated to 60 to 70° C. under reduced pressure using a rotary evaporator, and water was evaporated. The obtained solid residue was dried in an oven at 105° C. for 16 hours to completely remove water. The dried catalyst was calcined at 800° C. for 2 hours to prepare a tungstate zirconia (W—$ZrO_2$) support.

Preparation of Hydrodeoxygenation Catalyst 0.35 g of ruthenium chloride hydrate was mixed with 50 g of distilled water and added with 5 g of the tungstate zirconia (W—$ZrO_2$) support prepared above, and then stirred for 12 hours. After stirring, the mixture was transferred to a round flask, and heated to 60° C. to 70° C. using a rotary evaporator to evaporate water. The obtained solid residue was dried in an oven at 105° C. for 16 hours to completely remove water. The dried catalyst was subjected to reduction at 350° C. for 2 hours in a 5% $H_2$/Ar atmosphere. After the reduction, the catalyst was exposed for 30 minutes in a 1% $O_2/N_2$ atmosphere to prevent deactivation of the catalyst and then stored.

The metal precursor and the support in the preparation method of Example 1 may vary depending on the catalyst to be prepared.

Example 2

Deoxygenation Reaction of Oxygenated Compound

A deoxygenation reaction of an oxygenated hydrocarbon compound was carried out using a two-step continuous reactor. The reactant was a $C_{15}H_{18}O_3$ compound prepared by the polymerization of a furan-based compound and represented by Chemical Formula 1. In Chemical Formula 1, reactant 1 was "5,5'-(furan-2-ylmethylene)bis(2-methylfuran)", reactant 2 was "5,5-bis(5-methylfuran-2-yl)pentan-2-one" and an isomer having a molecular formula of $C_{15}H_{14}O_3$, and the mixture thereof was used as a reactant of the deoxygenation reaction.

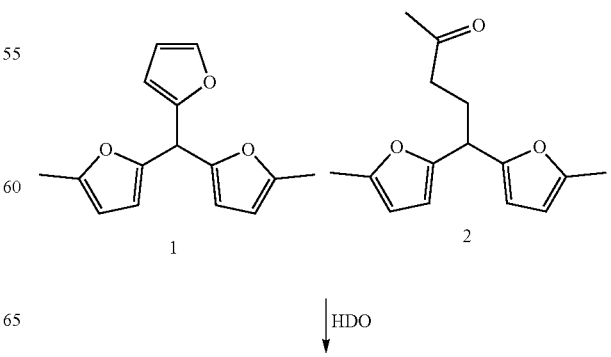

[Chemical Formula 1]

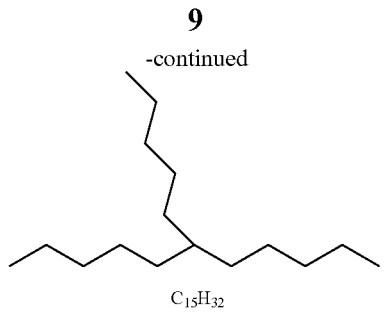

C₁₅H₃₂

Example 3

Configuration of Deoxygenation Reaction Device of Oxygenated Hydrocarbon Compound The reaction device may comprise a hydrogen storage device 10 for injecting high-pressure hydrogen, a container 20 for injecting an oxygenated compound, a reactor 30 connected with a heating device for high-temperature and high-pressure reaction capable of separately carrying out a hydrotreating reaction and a hydrodeoxygenation reaction at the same time, a device 40 for cooling a reaction product, and a device 50 for collecting a final product (see FIGURE).

The pressure in the reactor was maintained at 100 bar, the temperature of the hydrogenation reaction in the first reactor 30 was 190° C. to 230° C., and the temperature of the hydrodeoxygenation reaction in the second reactor 40 was 250° C. to 380° C. After the reaction, the catalyst and the obtained product were recovered and weighed and analyzed.

The hydrogenation and hydrodeoxygenation reactions of the oxygenated hydrocarbon compound were carried out using the catalysts prepared in Example 1. As a catalyst for the hydrogenation reaction, palladium (Pd/C) immersed in a carbon support, nickel (Ni/CeO₂) immersed in a cerium oxide support, and a nickel (Ni/ZrO₂) catalyst immersed in a zirconium oxide support were used, and as a catalyst for the hydrodeoxygenation reaction, platinum (Pt) immersed in a carbon (C) support or ruthenium (Ru) or nickel (Ni) immersed in a tungstate zirconia (W—ZrO₂) support was used.

Example 4

Results of Dehydrogenation Reaction of Oxygenated Hydrocarbon Compound

Table 1 below shows the results obtained by carrying out only a hydrodeoxygenation reaction at 350° C. without a first-step hydrogenation reaction for various catalysts as Comparative Example of the present invention. The coke generation amount was calculated by a thermogravimetry analysis result of the catalyst after the reaction, so that the carbon support catalyst having a large error was excluded.

TABLE 1

| Example | First-step hydrogenation catalyst | Second-step hydrodeoxygenation catalyst | Oil yield (g/g feed) | Coke generation amount (g/g feed) | O/C ratio (atom/atom) | H/C ratio (atom/atom) |
|---|---|---|---|---|---|---|
| Comparative Example 1 | | Before reaction[1] | — | — | 0.27 | 1.1 |
| Comparative Example 2 | | 5 wt % Pd/C | 0.633 | — | 0.019 | 2.1 |
| Comparative Example 3 | | 5 wt % Ru/C | 0 (only water layer is generated) | — | — | — |
| Comparative Example 4 | | 5 wt % Pt/C | 0.419 | — | 0.007 | 2.1 |
| Comparative Example 5 | | 3 wt % Ru/W—ZrO₂ | 0.318 | 0.0279 | 0.001 | 1.9 |

[1] is a result calculated using 5,5'-(furan-2-ylmethylene)bis(2-methylfuran) as a reactant.

Table 2 below shows the results obtained by carrying out only a hydrodeoxygenation reaction at 250° C. without a first-step hydrogenation reaction for various catalysts as Comparative Example of the present invention.

TABLE 2

| Example | First-step hydrogenation catalyst | Second-step hydrodeoxygenation catalyst | Oil yield (g/g feed) | Coke generation amount (g/g feed) | O/C ratio (atom/atom) | H/C ratio (atom/atom) |
|---|---|---|---|---|---|---|
| Comparative Example 6 | — | 3 wt % Ru/W—ZrO₂ | 0.536 | 0.0034 | 0.006 | 2.1 |
| Comparative Example 7 | — | 50 wt % Ni/W—ZrO₂ | 0.632 | 0.0237 | 0.031 | 2.0 |

Table 3 below shows the results of a deoxygenation reaction of an oxygenated hydrocarbon compound in which a hydrogenation reaction was carried out at 200° C. and a hydrodeoxygenation reaction was carried out at 350° C. as an Example of the present invention.

TABLE 3

| | First-step hydrogenation catalyst | Second-step hydrodeoxygenation catalyst | Oil yield (g/g feed) | Coke generation amount (g/g feed) | O/C ratio (atom/atom) | H/C ratio (atom/atom) |
|---|---|---|---|---|---|---|
| Comparative Example 1 | Before reaction | Before reaction | — | — | 0.27 | 1.1 |
| Example 1 | 5 wt % Pd/C | 3 wt % Ru/W—ZrO$_2$ | 0.752 | 0.0006 | 0.008 | 2.1 |
| Example 2 | 5 wt % Pd/C | 5 wt % Pt/C | 0.799 | — | 0.005 | 2.2 |

Table 4 below shows the results of a deoxygenation reaction of an oxygenated hydrocarbon compound in which a hydrogenation reaction was carried out at 200° C. and a hydrodeoxygenation reaction was carried out at 250° C. as an Example of the present invention.

TABLE 4

| | First-step hydrogenation catalyst | Second-step hydrodeoxygenation catalyst | Oil yield (g/g feed) | Coke generation amount (g/g feed) | O/C ratio (atom/atom) | H/C ratio (atom/atom) |
|---|---|---|---|---|---|---|
| Example 3 | 5 wt % Pd/C | 3 wt % Ru/W—ZrO$_2$ | 0.731 | 0.0005 | 0.006 | 2.4 |
| Example 4 | 5 wt % Pd/C | 20 wt % Ni/W—ZrO$_2$ | 0.758 | 0.0012 | 0.009 | 2.2 |
| Example 5 | 10 wt % Ni/ZrO2 | 20 wt % Ni/W—ZrO$_2$ | 0.707 | 0.029 | 0.015 | 2.1 |
| Example 6 | 10 wt % Ni/CeO2 | 20 wt % Ni/W—ZrO$_2$ | 0.770 | 0.02 | 0.008 | 2.1 |

It can be confirmed that the two-step deoxygenation method of the oxygenated hydrocarbon compound according to an embodiment of the present invention may obtain a much higher oil yield than a conventional single-step deoxygenation method. In addition, it was confirmed that the two-step deoxygenation method had a lower coke generation amount than the single-step deoxygenation method. Accordingly, it was confirmed that a high oil yield and a low coke generation amount may be achieved through the deoxygenation method having two steps even if a catalyst in which a noble metal was replaced with an inexpensive metal element such as Ni was used.

According to an aspect of the present invention, it is possible to provide a reaction method of preparing a deoxygenated compound from an oxygenated hydrocarbon compound using a hydrogenation catalyst in a first step and a hydrodeoxygenation catalyst in a second step.

According to another aspect of the present invention, it is possible to provide a method of suppressing catalyst deactivation and improving a yield in a hydrodeoxygenation reaction of an oxygenated hydrocarbon compound.

While the present invention has been described with respect to the specific embodiments, it will be apparent to those skilled in the art that various changes and modifications may be made without departing from the spirit and scope of the invention as defined in the following claims.

What is claimed is:

1. A method comprising:
adding hydrogen and a mixture of oxygenated hydrocarbon compounds obtained by decomposition of biomass to a reactor, and subjecting the mixture to a hydrogenation reaction in the presence of a hydrogenation catalyst comprising at least one metal selected from the group consisting of nickel (Ni), palladium (Pd), and cobalt (Co) to provide a hydrogenated mixture, wherein the at least one metal of the hydrogenation catalyst is immersed in a carrier comprising a cerium oxide; and
subjecting the hydrogenated mixture to a hydrodeoxygenation reaction in the presence of a hydrodeoxygenation catalyst comprising nickel (Ni) immersed in a mixed oxide carrier comprising tungsten and zirconium.

2. The method of claim 1, wherein the carrier of the hydrogenation catalyst further comprises zirconia (zirconium oxide, ZrO$_2$).

3. The method of claim 1, wherein the mixed oxide carrier of the hydrodeoxygenation catalyst is tungstate zirconia.

4. The method of claim 1, wherein the at least one metal of the hydrogenation catalyst is nickel.

5. The method of claim 3, wherein the content of the tungsten comprised in the tungstate zirconia is 5 wt % to 25 wt % based on the total weight of the mixed oxide carrier.

6. The method of claim 1, wherein the content of the at least one metal immersed in the carrier of the hydrogenation catalyst is 1 wt % to 50 wt % based on the total weight of the hydrogenation catalyst.

7. The method of claim 1, wherein the content of the at least one metal immersed in the carrier of the hydrodeoxygenation catalyst is 1 wt % to 50 wt % based on the total weight of the hydrodeoxygenation catalyst.

8. The method of claim 1, wherein the reactor is a two or more step continuous reactor connecting the hydrogenation hydrodeoxygenation reactions.

9. The method of claim 1, wherein the hydrogenation and hydrodeoxygenation reactions are carried out continuously in the reactor.

10. The method of claim 1, wherein the hydrogenation reaction is carried out at 50° C. to 250° C.

11. The method of claim 1, wherein the hydrodeoxygenation reaction is carried out at 200° C. to 400° C.

12. The method of claim 1, wherein the hydrogenation reaction is carried out before the hydrodeoxygenation reaction to increase an oil yield.

13. The method of claim 1, wherein the hydrogenation reaction is carried out before the hydrodeoxygenation reaction to suppress deactivation of the hydrodeoxygenation catalyst.

14. The method of claim 1, wherein the mixture of oxygenated hydrocarbon compounds comprises at least one of guaiacol, diphenyl ether, or benzyl phenyl ether.

15. The method of claim 3, wherein the content of tungsten in the tungstate zirconia is 5 wt % to 16 wt % based on the total weight of the mixed oxide carrier, and the at least one metal of the hydrodeoxygenation catalyst further comprises ruthenium.

* * * * *